June 4, 1929.  T. C. HARVEY  1,716,170
LOADER TRUCK
Filed June 11, 1928   3 Sheets-Sheet 1
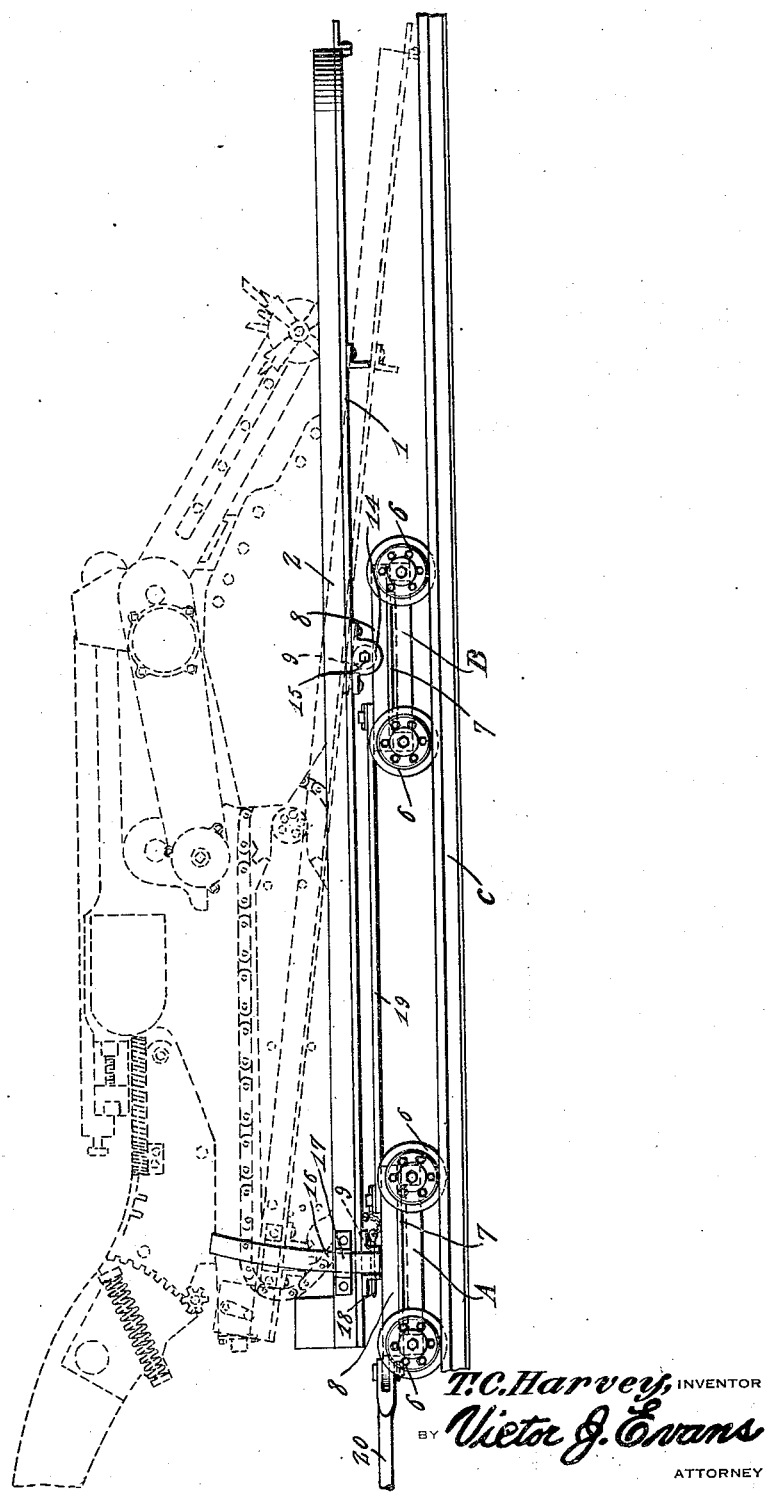
T. C. Harvey, INVENTOR
BY Victor J. Evans
ATTORNEY

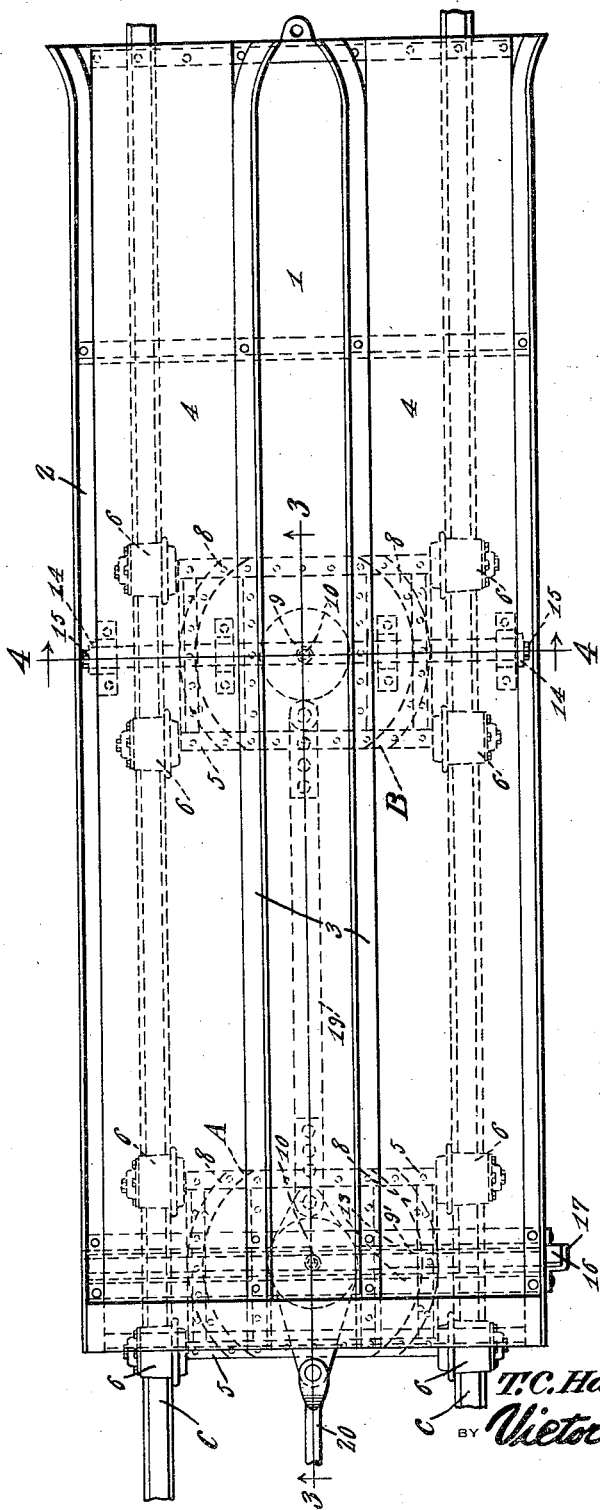

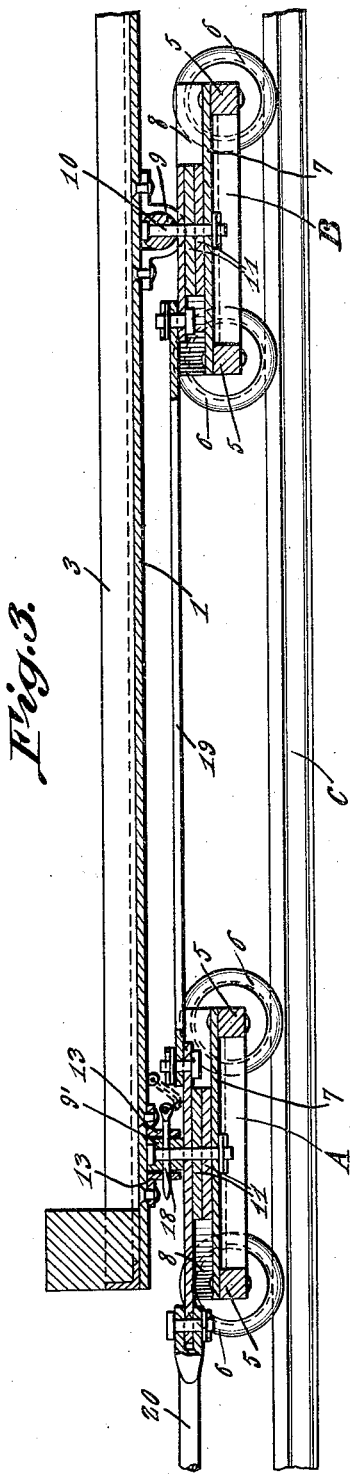
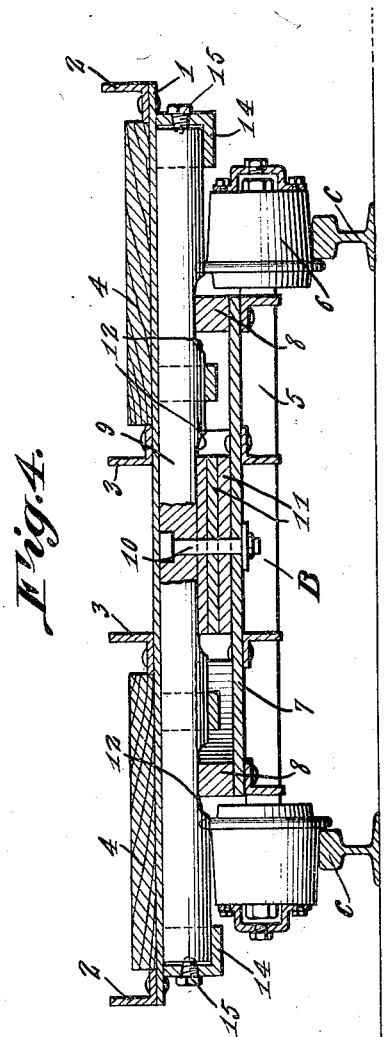

Patented June 4, 1929.

1,716,170

UNITED STATES PATENT OFFICE.

THOMAS C. HARVEY, OF COLUMBIA, UTAH.

LOADER TRUCK.

Application filed June 11, 1928. Serial No. 284,598.

This invention relates to a truck for the transportation of heavy machinery and the like, such as caterpillar or tractor driven mechanical loaders, such as used in mines, the general object of the invention being to provide a platform supported by a number of trucks in such a manner that the platform can be tilted to permit one end to rest on the track or surface over which the device is arranged to travel, so that machinery can be easily run upon the platform under its own power, or otherwise caused to pass up the tilted platform which will automatically lower to its normal horizontal position as soon as the weight of the machinery comes thereon.

A further object of the invention is to so connect the trucks with the platform that the trucks can readily pass around curves in a track or a surface over which the device is traveling without interference on the part of the platform.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of the improved device, showing a loader thereon, the platform being shown in inclined position in dotted lines.

Figure 2 is a top plan view of the device.

Figure 3 is a section on line 3—3 of Figure 2.

Figure 4 is a section on line 4—4 of Figure 2.

In these views, the numeral 1 indicates the platform or body of the device which has its rear end flaring and an angle beam 2 is fastened to each edge of the platform to form guiding means for the tractor elements of the loader or other machinery being placed on the platform. A pair of angle beams 3 is also fastened to the platform adjacent its longitudinal center for strengthening the same and these beams also form guiding means for the tractor elements of the loader.

The rear ends of the beams 2 flare outwardly, while the rear ends of the beams 3 are convergently arranged, as clearly shown in Figure 2, so that the rear ends of the beams form guiding means for the tractor elements to guide the same upon the platform. The portions engaged by the tractor elements of the loader are covered with boards, as shown at 4, so that the elements can secure traction on the platform. This platform or body is supported by two trucks A and B, the truck A supporting the front end of the body and the truck B being arranged a distance from the rear end thereof so that the body or platform can tilt on this truck B until its rear end rests upon the track or surface upon which the trucks are resting.

Each truck comprises a pair of axles 5, each having a wheel 6 rotatably arranged at each end thereof, the axle being preferably of square shape in cross section. A platform or plate 7 bridges the space between the two axles and is suitably fastened to the axles. Arc-shaped members 8 are fastened to the side edges of each plate 7 and form a support for a bolster 9 which is pivotally connected at its center to the center of the plate 7 by a king bolt 10 which also passes through the disks 11 which are placed between the plate 7 and the central part of the bolster. The bolster is formed with flattened portions 12 on its under side which are engaged by the members 8. The bolster of the truck B is of circular shape in cross section, but the bolster 9' for the front truck is flat and a pair of channel irons 13 is fastened to the under face of the front part of the platform or body and these channel irons are spaced apart to receive the bolster 9' between them when the platform or body is in horizontal position.

The platform is formed with the hangers 14 at its sides for receiving the ends of the bolster 9 and these hangers are pivoted to the ends of the bolster 9 by the bolts 15. Thus the platform or body is pivotally connected with the rear truck B and one end of the bolster 9' is provided with a curved upright 16 which engages a bracket 17 placed on one side of the platform adjacent the front thereof so that these parts guide the platform or body in its tilting movement. A pin 18 is adapted to be passed through holes in the channel irons 13 and the front bolster 9' to hold the platform or body in horizontal position and against tilting movement.

It will, of course, be understood that several of these pins can be used and that an upright 16 and its bracket 15 can be placed at the other side of the truck instead of using but one set of guiding means. The two trucks are connected together by the bar 19 which has its ends pivotally connected with the trucks and a draw bar 20 is connected with the front truck so that the device can be attached to a motor car or any other propelling device so that it can be pulled or pushed along the track C with which the wheels engage.

From the foregoing it will be seen that by removing the pin 18, the platform or body can be tilted on the truck B so that its rear end will rest upon the track, as shown in dotted lines in Figure 1, thus permitting a loader or other machinery to be loaded on the body. If the machinery is provided with self-propelling means, the machinery can pass upon the body under its own power as its tractor elements will engage the tracks formed by the boards 4 and its elements will be guided by the bars 2 and 3. After the body or platform has moved to horizontal position, the pin 18 is put in position to hold it in this horizontal position and then the truck with the machinery thereon can be transported from one place to another. This device will not only enable loaders and other machinery to be quickly and easily transported from one place to another, but it also prevents the loaders from damaging tracks, bridges and the like and by transporting a loader on this truck, damage or injury to the loader itself is prevented.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. A transportation device comprising a platform, a number of trucks for supporting the platform, the rear truck being arranged a distance from the rear end of the platform, means for pivotally connecting the platform with the rear truck whereby the platform can be tilted until its rear end rests upon the surface on which the wheels of the trucks rest and means associated with the front truck for guiding the front end of the platform during its tilting movement.

2. A transportation device comprising a platform, a number of trucks for supporting the platform, the rear truck being arranged a distance from the rear end of the platform, means for pivotally connecting the platform with the rear truck whereby the platform can be tilted until its rear end rests upon the surface on which the wheels of the trucks rest, means associated with the front truck for guiding the front end of the platform during its tilting movement and means for rotatably connecting each truck with the platform.

3. A transportation device comprising a platform, a number of trucks for supporting the platform, the rear truck being arranged a distance from the rear end of the platform, means for pivotally connecting the platform with the rear truck whereby the platform can be tilted until its rear end rests upon the surface on which the wheels of the trucks rest, means associated with the front truck for guiding the front end of the platform during its tilting movement, means for rotatably connecting each truck with the platform and guiding means on the platform for guiding the tractor elements of machinery being placed on the platform.

4. A transportation truck comprising a body, a pair of trucks for supporting the same, each truck comprising a pair of spaced axles with wheels at the ends of the axles, a platform for connecting each pair of axles together, a bolster for each truck, a king pin connecting each bolster with each truck, means for rotatably connecting the body with the bolster of the rear truck, means for detachably connecting the body with the bolster of the front truck, guiding means for the body associated with the front truck for guiding the body during its tilting movement on the rear truck and a bar pivotally connecting the two trucks together.

In testimony whereof I affix my signature.

THOMAS C. HARVEY.